(12) United States Patent
Trevisan et al.

(10) Patent No.: US 9,780,670 B2
(45) Date of Patent: Oct. 3, 2017

(54) METHOD FOR DRIVING A RESONANT CONVERTER, AND CORRESPONDING DEVICE AND COMPUTER PROGRAM PRODUCT

(71) Applicant: STMicroelectronics S.R.L., Agrate Brianza (IT)

(72) Inventors: Lorenzo Trevisan, Tavazzano con Villavesco (IT); Massimiliano Picca, Muggiò (IT); Roberto Cardu, Bologna (IT); Cristian Porta, Canegrate (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 3 days.

(21) Appl. No.: 15/141,337

(22) Filed: Apr. 28, 2016

(65) Prior Publication Data

US 2017/0099002 A1 Apr. 6, 2017

(30) Foreign Application Priority Data

Oct. 1, 2015 (IT) .................. 102015000057306

(51) Int. Cl.
*H02M 3/335* (2006.01)
*H02M 1/08* (2006.01)

(52) U.S. Cl.
CPC ......... *H02M 3/33507* (2013.01); *H02M 1/08* (2013.01)

(58) Field of Classification Search
CPC ............ H02M 3/335; H02M 3/33507; H02M 3/33523; H02M 1/08
USPC ......................... 363/16, 17, 21.02
See application file for complete search history.

(56) References Cited

U.S. PATENT DOCUMENTS

| | | | |
|---|---|---|---|
| 2008/0247194 A1* | 10/2008 | Ying ................... | H02M 3/3376 363/17 |
| 2010/0020569 A1 | 1/2010 | Melanson et al. | |
| 2011/0194206 A1* | 8/2011 | Sase .................. | H02M 3/33592 360/75 |
| 2013/0229829 A1* | 9/2013 | Zhang ............... | H02M 3/33546 363/16 |
| 2014/0146574 A1 | 5/2014 | Worek | |

(Continued)

FOREIGN PATENT DOCUMENTS

| | | |
|---|---|---|
| DE | 10 2011 078 579 A1 | 1/2013 |
| EP | 2 823 781 A1 | 1/2015 |

*Primary Examiner* — Kyle J Moody
(74) *Attorney, Agent, or Firm* — Seed IP Law Group LLP

(57) ABSTRACT

A resonant converter includes a primary switching circuit with a primary winding and a primary full-bridge switching stage that drives the primary winding. A resonance inductor is in series with the primary winding. A secondary resonant circuit has a secondary winding magnetically coupled to the primary winding and a resonance capacitor electrically connected in parallel with the secondary winding. A secondary rectification stage is electrically connected in parallel to the resonance capacitor. A driving module receives a signal representing the voltage measured across an upper or lower switching half-bridge. The drive module detects a negative voltage in the signal. At each cycle, the drive module anticipates a control signal for control of the switches of the lower or upper switching half-bridge that is to be activated the next switching cycle by a shift time that is reduced cycle until the condition of absence of negative voltage in the signal is satisfied.

20 Claims, 7 Drawing Sheets

(56) References Cited

U.S. PATENT DOCUMENTS

| | | | |
|---|---|---|---|
| 2014/0254203 A1* | 9/2014 | Dai | H02M 3/3353 363/17 |
| 2014/0376269 A1* | 12/2014 | Johnson | H02M 3/33507 363/17 |
| 2015/0098250 A1* | 4/2015 | Wu | H02M 3/33507 363/17 |
| 2015/0222193 A1 | 8/2015 | Zambetti et al. | |
| 2015/0349649 A1* | 12/2015 | Zane | H02M 3/33507 363/21.03 |
| 2017/0099001 A1* | 4/2017 | Cardu | H02M 1/08 |

* cited by examiner initial situation final situation

METHOD FOR DRIVING A RESONANT CONVERTER, AND CORRESPONDING DEVICE AND COMPUTER PROGRAM PRODUCT

BACKGROUND

Technical Field

The present disclosure relates to resonant converters. More in particular, the disclosure regards techniques for driving a full-bridge resonant converter.

Description of the Related Art

Power distribution in the field of servers and data-centers is undergoing continuous evolution. The continuous growth of these electronic devices requires maximization of the efficiency of the voltage converters that supply them in order to minimize the power required given the same power delivered, so as to limit thermal dispersion in the environments in which they are installed and hence the power used by the corresponding cooling equipment.

There exist various voltage-distribution systems, which are supplied by the mains voltage and convert it into the various voltage levels down to the voltage VCPU required by the processor. Currently, the mains voltage is converted into a first voltage distributed on a main supply bus, then converted into a second, lower, voltage (typically 12 V) distributed on an intermediate bus, and finally converted into the voltage VCPU for supply of the processors. To optimize the efficiency of the systems upstream of the processor, the main supply bus is at a voltage of 48 V.

However, some applications require direct conversion of the voltage from Vin=48 V to Vout=1.2 V, without passing through the intermediate conversion for the 12-V bus, for supplying CPUs and DDR (Double Data Rate) memories.

Other applications may, instead, require direct conversion between Vin=54 V and Vout=12 V.

BRIEF SUMMARY

In the scenario outlined previously, there is consequently felt the need for techniques for driving a full-bridge resonant converter that will enable improvement of the efficiency and reduction of electromagnetic interference.

This can be achieved by preventing current inversion in a device for driving a full-bridge resonant voltage converter.

In particular, by preventing turning-on of the diodes within the transistors used as switches on the primary side, a marked improvement of the efficiency is obtained due to the absence of losses due to the diodes within the transistors.

One or more embodiments meet the above requirement.

In one embodiment, a resonant converter includes a primary switching circuit having at least a primary winding and a primary full-bridge switching stage, which is configured for driving said primary winding, and a resonance inductor in series with the primary winding. A secondary resonant circuit has a secondary winding magnetically coupled to the primary winding, and a resonance capacitor electrically connected in parallel to the secondary winding. A secondary rectification stage is electrically connected in parallel to the resonance capacitor. A driving module is configured to receive at an input a signal representing the voltage measured across an upper switching half-bridge or a lower switching half-bridge. The driving module detects the presence of a negative voltage in the signal representing the voltage measured across said upper switching half-bridge or lower switching half-bridge. The driving module is further configured, at each cycle, to anticipate the control signal for control of the switches of the lower switching half-bridge or upper switching half-bridge that is to be activated at the next switching cycle by a shift time that is reduced at each cycle until the condition of absence of negative voltage in the signal representing the voltage measured across said upper switching half-bridge or lower switching half-bridge is satisfied.

One or more embodiments may refer to a corresponding method, as well as a computer program product that that can be loaded into the memory of at least one computer device and comprises portions of software code for executing the steps of the method when the product is run on at least one computer. As used herein, reference to such a computer program product is understood as being equivalent to reference to a computer-readable means containing instructions for controlling the computer system in order to co-ordinate implementation of a method according to the present disclosure. Reference to "at least one computer device" is intended to highlight the possibility for the present disclosure to be implemented in a modular and/or distributed form.

The claims form an integral part of the description of one or more embodiments as provided herein.

BRIEF DESCRIPTION OF THE SEVERAL VIEWS OF THE DRAWINGS

One or more embodiments will now be described purely by way of non-limiting example, with reference to the annexed plates of drawings, wherein.

DETAILED DESCRIPTION

Illustrated in the ensuing description are one or more specific details, aimed at providing an in-depth understanding of various embodiments by way of example. The embodiments may be obtained without one or more of these specific details, or else with other methods, components, materials, etc. In other cases, known structures, materials, or operations are not represented or described in detail so that some aspects of the embodiments will not be obscured.

Reference to "an embodiment" or "one embodiment" in the context of the present description is aimed at indicating that a particular configuration, structure, or characteristic described in relation to the embodiment is comprised in at least one embodiment. Hence, phrases such as "in an embodiment" or "in one embodiment", or the like that may be present in one or more points of the present description do not necessarily refer to one and the same embodiment.

Furthermore, particular configurations, structures, or characteristics may be combined in any adequate way in one or more embodiments.

The references used herein are provided simply for convenience and hence do not define the sphere of protection or the scope of the embodiments.

Figure 1:
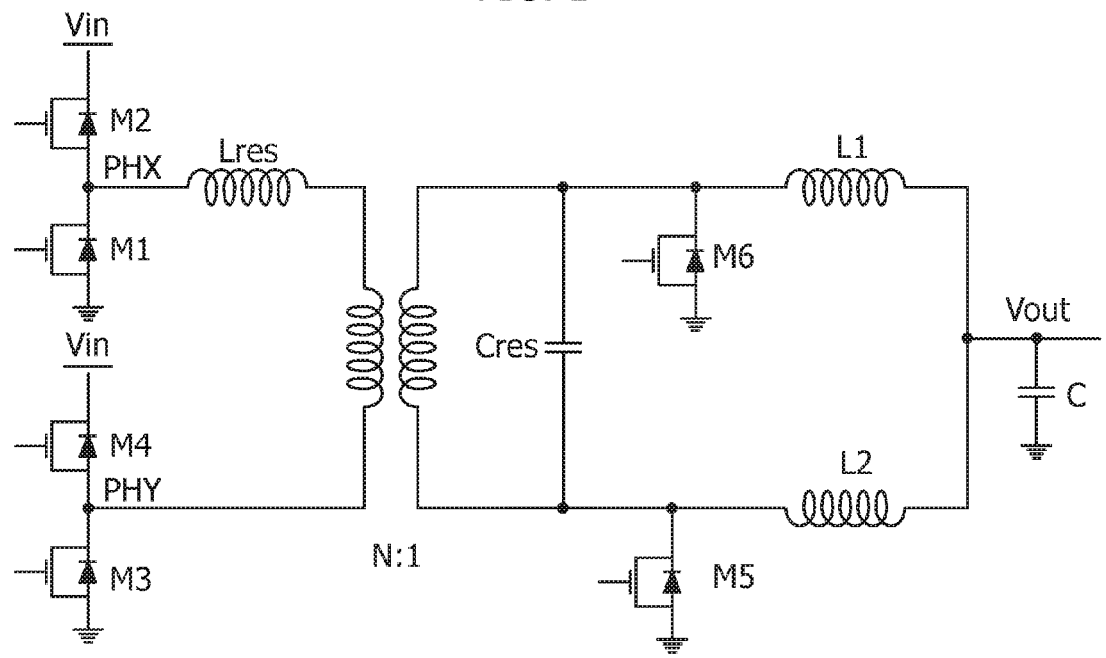
FIG. 1 shows an example of a resonant converter.

The sphere of application is the full-bridge resonant converter the principle diagram of which is represented in FIG. 1.

In FIG. 1, the switches M1-M2-M3-M4-M5-M6 are obtained via transistors. For instance, in the embodiment proposed and illustrated in the figures, the switches are obtained with MOSFETs (Metal-Oxide-Semiconductor Field-Effect Transistors) used in on/off or switching mode.

In the ensuing description, the terms "switch" and "transistor" will be used interchangeably in so far as the transistors are made to work in their operating area where they behave as switches.

The MOS transistors M1-M2-M3-M4 form the full-bridge converter: M2 and M4 are referred to as "high-side power transistors", whereas M1 and M3 are referred to as "low-side power transistors".

Figure 2:
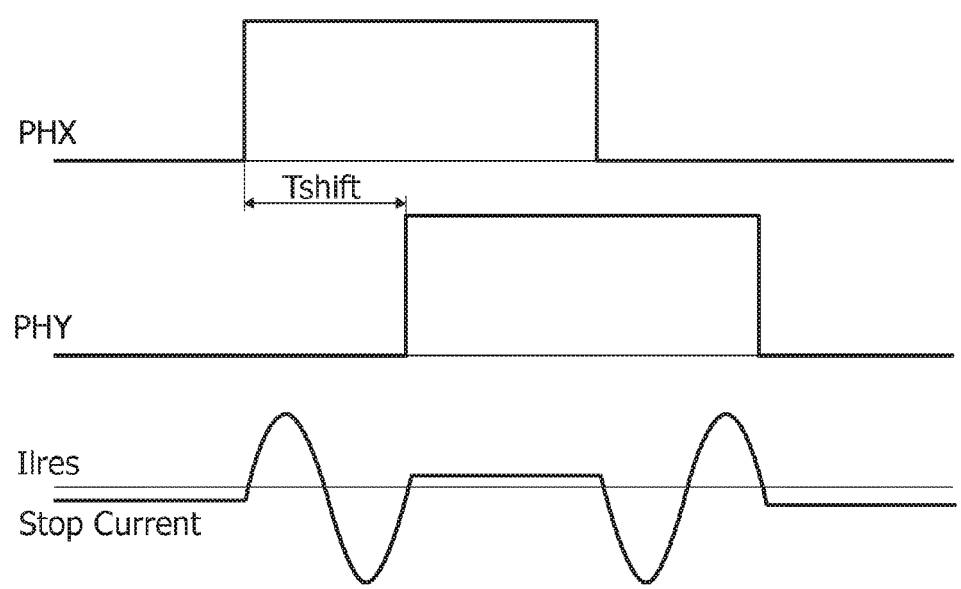
FIG. 2 shows timing charts of the main signals that flow in the resonant converter of FIG. 1.

In this type of converter the control signals that drive the pairs of MOS transistors M1-M2 and M3-M4 on the primary, are shifted by a time Tshift=Tres, where Tres is the typical resonance time of the network Lres-Cres (see FIG. 2).

Since the components Lres and Cres have an intrinsic process spread, in general a shift time Tshift is chosen longer than the time Tresmax (Tshift>Tresmax), where Tresmax is the maximum resonance period obtained considering the worst case of the process spread of the components Cres and Lres.

Represented in FIG. 2 are the signals that are obtained on the nodes PHX and PHY, which will be referred to as a whole in what follows also as the "nodes PHASE", and the current that flows in the inductor Lres and hence in the active MOS transistors.

As illustrated in FIG. 2, it may be seen that in the phases where the low-side transistors M1 and M3 are both on (PHX and PHY at the low level, corresponding to 0 V) or where the high-side transistors M2 and M4 are both on (PHX and PHY at the high level, corresponding to Vin) the current assumes constant and small values. These values are denoted by Istop.

Instead, in the phases where the diagonals are on, i.e., the node PHX is at the high level, corresponding to Vin (PHX=Vin) and the node PHY is at the low level, corresponding to 0 V (PHY=0 V) (i.e., when the transistors M2 and M3 are on), or else the node PHY is at the high level, corresponding to Vin (PHY=Vin) and the node PHX is at the low level, corresponding to 0 V (PHX=0 V) (i.e., when the transistors M3 and M1 are On), the current increases linearly when the switches M5 and M6 on the secondary are closed and then assumes a sinusoidal waveform due to the resonance of the network Lres-Cres at the moment when one of the switches M5 or M6 on the secondary is opened.

It may be noted that the greater the value of the shift time Tshift set, the greater the absolute value of the stop currents Istop.

In this analysis, it should moreover be taken into consideration that the pairs of MOS transistors M1-M2 and M3-M4 must never be on simultaneously to prevent a direct current path from being set up between Vin and ground, thus causing damage to the MOS transistors themselves.

In other words, within one half-bridge (the upper pair M1-M2 or the lower pair M3-M4) there must be a time, denoted by DEAD TIME, that elapses between turning-off of a high-side power transistor and turning-on of the low-side power transistor, and vice versa.

Figure 3:
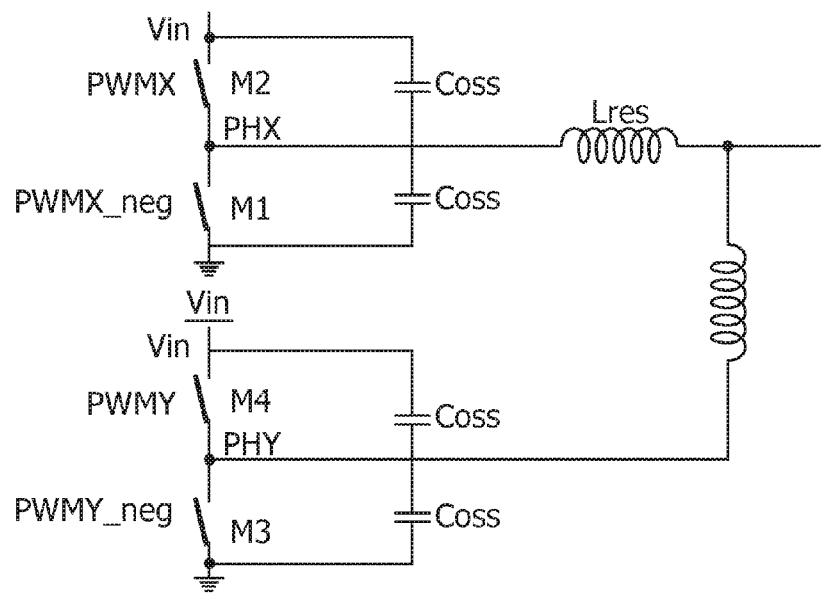
FIG. 3 shows the equivalent circuit of the primary side of the resonant converter of FIG. 1 with the parasitic capacitances highlighted.

During the period DEAD TIME, a resonance is generated with secondary to the one seen previously, which involves the parasitic capacitance Coss between the drain and source terminals of the MOS transistors and the inductor Lres: this aspect is represented in FIG. 3.

In particular, the high-side transistor M2 of the upper half-bridge is driven by the signal PWMX, whereas the low-side transistor M1 is driven by the negated signal PWMX_neg. Likewise, the high-side transistor M4 of the lower half-bridge is driven by the signal PWMY, whereas the low-side transistor M3 is driven by the negated signal PWMY_neg.

The parasitic capacitance Coss_HB of the half-bridge is twice the parasitic capacitance of each individual MOS transistor, i.e., Coss_HB=2·Coss_MOS.

This resonance has a characteristic time Tres_oss depending upon the inductance Lres and the capacitance Coss that has a value different from the time Tres depending upon the resonance network Lres-Cres.

In particular, the dead time DEAD TIME can be calculated as a function of the parasitic capacitance of the half-bridge $$Tres\_oss = 2\pi\sqrt{Lres \cdot Coss\_HB}$$

At this point, consider, for example, the transition of the voltage at the node PHX from the low level (0 V) to the high level (Vin). In particular, the converter is in the condition where first the low-side transistor M1 switches off and, after a time equal to DEAD TIME, the high-side transistor M2 switches on.

In this condition, the resonance of the network Lres-Coss enables the energy stored in the inductor Lres, due to the current Istop that was flowing therein before turning-off of the low-side transistor M1, to be transferred into the capacitance Coss, causing the voltage on the node PHX to increase even before turning-on of the high-side transistor M2.

This energy stored in the inductor Lres is totally transferred to the capacitance Coss in a time that is one quarter of the characteristic time Tres_oss.

If a dead time DEAD TIME is set shorter than a quarter of the characteristic time Tres_oss (DEAD TIME<¼Tres_oss), only a part of the energy is exchanged between the inductor Lres and the capacitance Coss.

Consequently, in these conditions (DEAD TIME<¼Tres_oss) the value reached by the voltage on the node PHX at the end of the period DEAD TIME will not be the maximum possible one due to the entire exchange of energy, but will be a lower value depending upon what was the initial value of energy stored in the inductor Lres at the start of the resonance.

As has been said previously, the above initial value of energy depends upon the intensity of the current Istop and hence, in practice, upon the length of the fixed shift time Tshift. In fact, from what has already been said previously, the longer the shift time Tshift, the higher the value of the current Istop.

Figure 4:
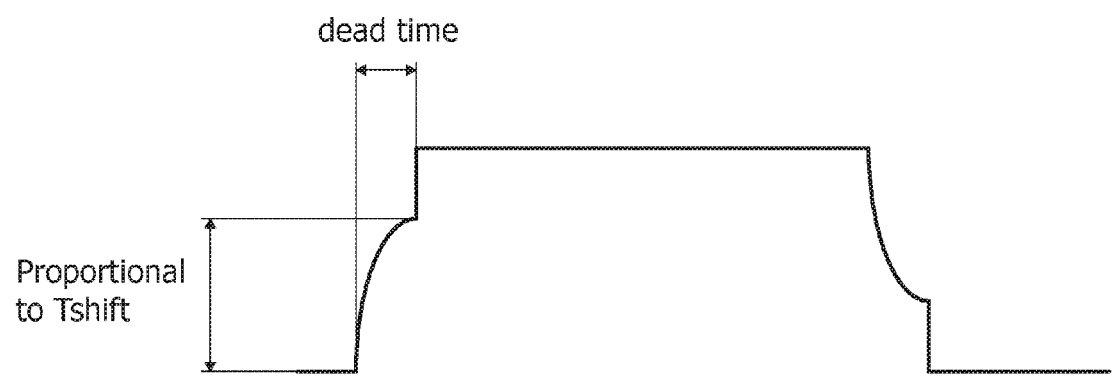
FIGS. 4, 5, and 6 show three possible cases according to the choice of the delay Tshift.
Figure 5:
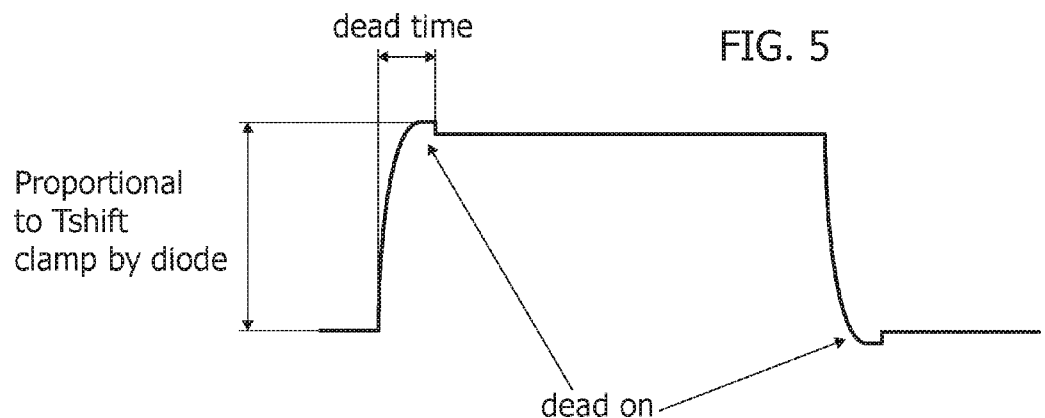
Figure 6:
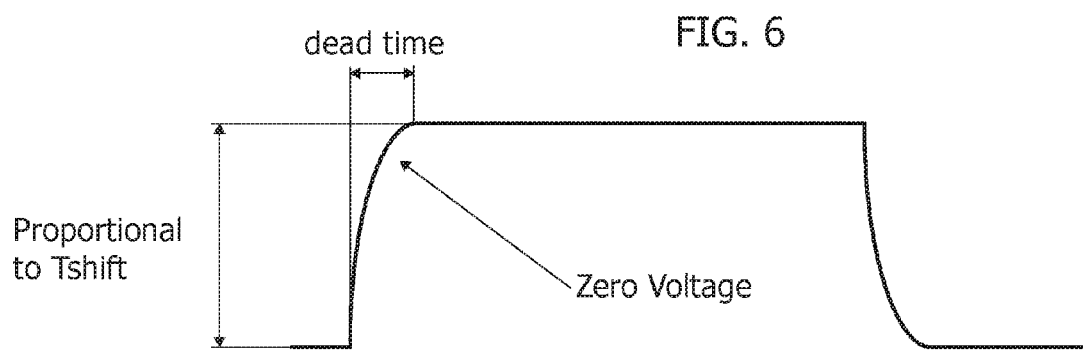

Hence, on the basis of the value of the shift time Tshift set, there may be three different cases of behavior of the converter.

a) The first case (illustrated in FIG. 4) is the one where the time Tshift is short. The voltage reached by the node PHX at the end of the dead time DEAD TIME is lower than the supply voltage Vin, and the curve of PHX is like the one represented in FIG. 4, where the node PHX instantaneously reaches the voltage Vin only upon closing of the high-side transistor M2 at the end of the dead time DEAD TIME. By symmetry, this behavior will occur also in the opposite transition of PHX from Vin to 0 V, where the high-side transistor M2 is first turned off, and after the dead time DEAD TIME the low-side transistor M1 is turned on.

b) The second case is represented in FIG. 5, where the time Tshift is very long. The voltage reached by the node PHX at the end of the dead time DEAD TIME is higher than the voltage Vin, but is clamped at a lower value by the fact that the diode of the high-side transistor M2 enters into conduction, the value being approximately 0.7 V above the supply voltage Vin until the high-side transistor M2 itself turns on, which brings the voltage back down to the value Vin. In the complementary transition, the voltage reached by the node PHX is clamped at −0.7 V by the fact that the diode of the low-side transistor M1 enters into conduction.

c) The third and last case is represented in FIG. 6, where the time Tshift has precisely the appropriate value such that, at the end of the dead time DEAD TIME, the voltage reached by the node PHX is exactly equal to the voltage Vin. As a consequence of this condition, no diode within the transistors enters into conduction, and turning-on of the MOS transistors occurs in a condition of perfect ZVS (Zero-Voltage Switching) in so far as the drain-to-source voltage of the transistors is zero and moreover almost in a condition of ZCS (Zero-Current Switching) in so far as the current flowing in the MOS transistors of the primary in the turning-on phase is a fraction of Istop, and is hence very small.

The third case c) represents the optimal condition for minimizing the losses due to switching and consequently leads to an improvement of the efficiency.

The idea underlying the solution described herein is to reach the condition of the third case c) described and illustrated in FIG. 6 in order to obtain switching in ZVS and quasi-ZCS condition. To obtain this result, the parameters described above are set according to the indications appearing below.

In particular, values are chosen for the times DEAD TIME and Tshift that respect the following rules:
  DEAD TIME<¼ Tres_oss_min, where Tres_oss_min is the smallest possible value of secondary resonance, considering the spread of the components Coss and Lres; and
  Tshift>>Tres_max, where Tres_max is the longest possible period of resonance of the main resonance of the network Lres-Cres, considering the process spread of these two components.

Figure 7A:
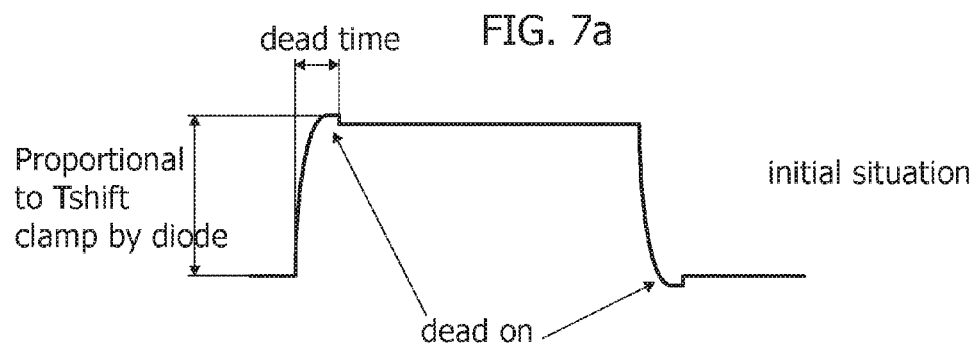
FIGS. 7a and 7b show how the condition of equilibrium of FIG. 6 is reached.
Figure 7B:
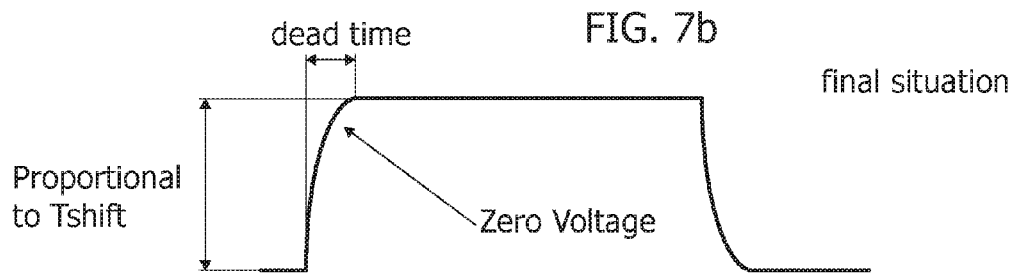

With the settings referred to above (Tshift>>Tres_max and DEAD TIME<¼Tres_oss_min), initially the converter is in a situation similar to the one illustrated in FIG. 5, but by monitoring the over-voltage or under-voltage in the low-to-high or high-to-low transition of the voltage signal measured at the node PHX (see FIGS. 7a and 7b), it is possible to exploit this information to reduce, cycle after cycle, the value of the time Tshift until the condition of equilibrium illustrated in FIG. 6 is in fact reached.

In particular, for reasons of simplicity of the analog circuitry required, it is more convenient to monitor the under-voltage at the end of the falling edge (FE) of the signal PHX (which represents the voltage on the node PHX) and to reduce, cycle after cycle, the time Tshift until the ZVS and quasi-ZCS condition is reached.

In this description, the situation referred to above will be analyzed, but it is of course possible to implement also the adequate circuitry for analyzing the rising edge (RE) of the signal PHASE (which represents the voltage on the node PHASE) so as to eliminate the over-voltages above the voltage Vin. Consequently, even though in what follows only the first solution is described, the intention is to protect both of the variants.

In particular, if Tshift_nom is the nominal time set initially, at each cycle of PWM the under-voltage of the signal PHASE is monitored, and the time Tshift is reduced by a very small amount referred to as δtshift until the value Tshift_targ is reached, namely, the optimal value such that the ZVS and quasi-ZCS condition is reached.

In what follows, the mechanism implemented to obtain this condition will be described.

The adaptive ZVS module, on the basis of what has been said previously, is a module that, by monitoring the under-voltage of the signal that represents the voltage on the node PHX after the high-side power transistor M2 is turned off, generates, cycle after cycle, a reduction of the time Tshift to achieve the quasi-ZCS and ZVS condition, where the diodes of the MOS transistors in the full-bridge M1-M2-M3-M4 do not enter into conduction and at the same time turning-on of the MOS transistors occurs with a drain-to-source voltage of approximately 0 V.

Figure 8:
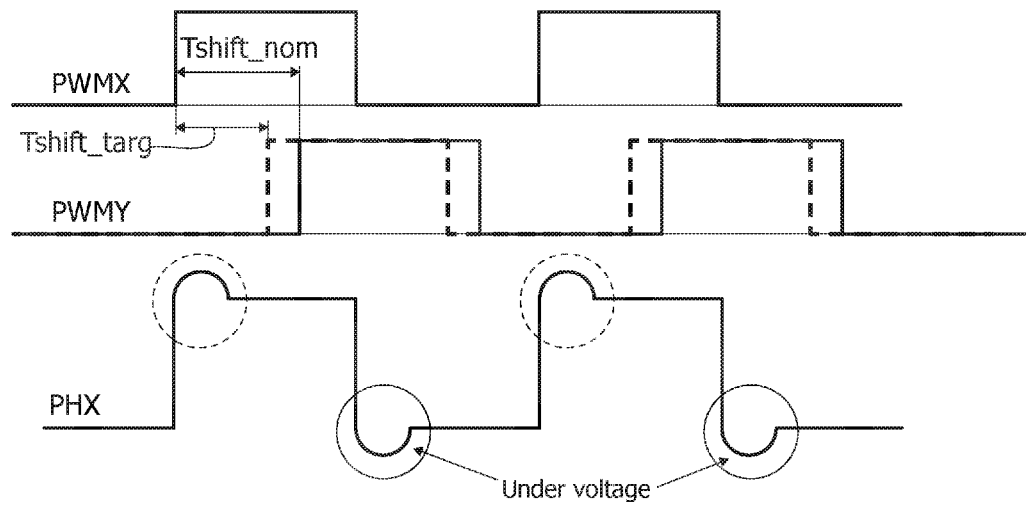
FIG. 8 shows timing charts of the main signals that flow in the resonant converter.

Illustrated in FIG. 8 are the low-voltage logic signals PWMX and PWMY for controlling, by means of appropriate drivers, the pairs of MOS transistors M1-M2 and M3-M4 that form the full-bridge on the primary, and the respective signals PHASE, PHX and PHY, that vary between 0 V and Vin to reach the situation of equilibrium described previously, where there is no formation of the under-voltage during switching.

In particular, represented in FIG. 8 is a working point where the quasi-ZCS and ZVS condition has not yet been reached.

Considering the signals represented in FIG. 8, the idea is to translate rigidly the signal PWMY from its nominal value PWMY_nom (represented by a solid line) fixed by the value of nominal time Tshift_nom (set as mentioned previously) to a value Tshift_targ (represented by a dashed line), which is the value to be reached for eliminating the under-voltage peaks (circled with a solid line) and by symmetry, the over-voltage peaks (circled with a dashed line).

To obtain this condition, starting from the time Tshift_nom, at each cycle the under-voltage is monitored, and the signal PWMY is anticipated in time by an amount δtshift, until the value is reached such that the under-voltages are eliminated. At this point, the ZVS and quasi-ZCS condition has been obtained by construction, and the diodes of the MOS transistors on the primary do not enter into conduction.

Figure 9:
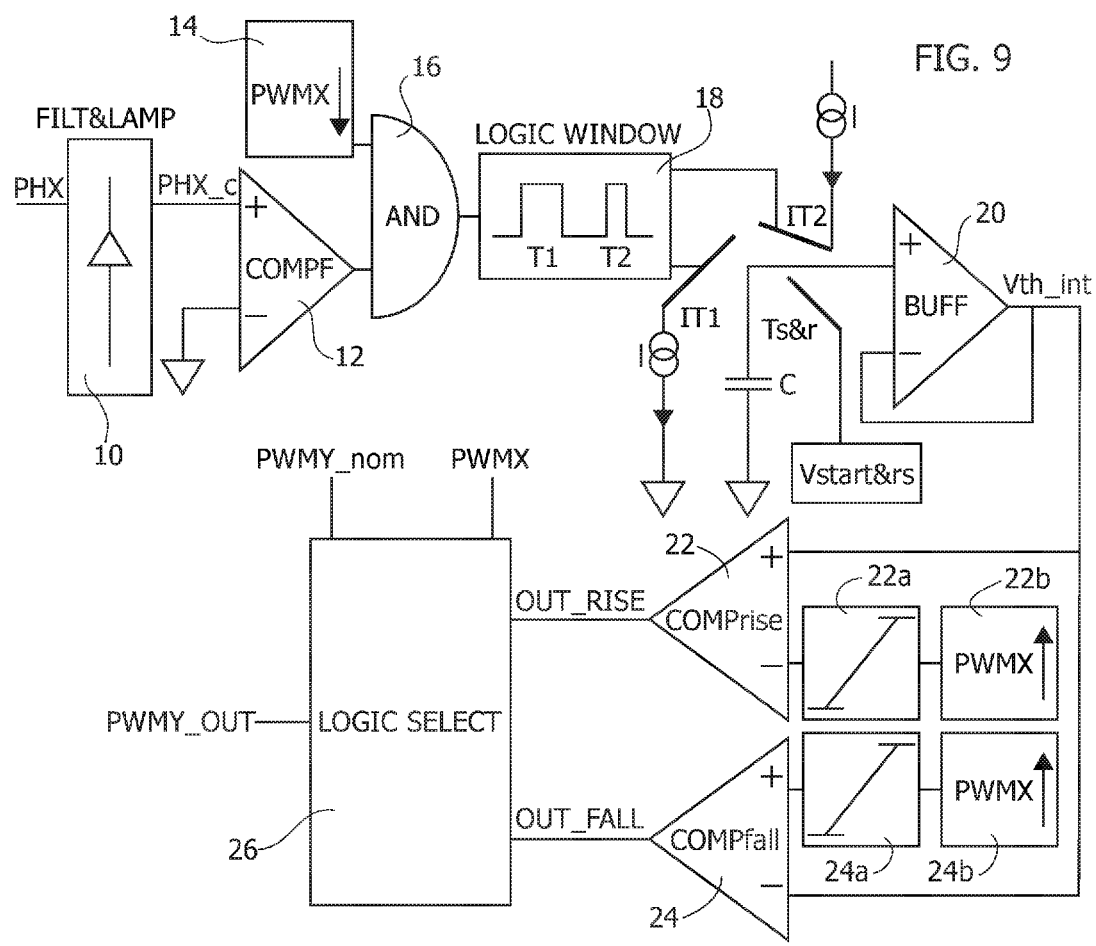
FIG. 9 represents a possible implementation of the driving module.

The driving module that at each cycle enables calculation of the value δtshift and reconstruction of the signal PWMY (represented with a dashed line) anticipated with respect to the nominal signal (represented with a solid line) is shown in FIG. 9.

The module illustrated in FIG. 9 receives at an input the signal PHX. This signal is initially filtered through a clamp circuit 10, which cleans it of the noise and clamps it between voltage values that can be used by the low-voltage circuits downstream, in so far as Vin, and consequently PHX, may reach also very high values (for example, 76 V).

Next, a fast comparator 12, with high gain and low offset, supplies the information on the points of crossing of the 0-V level by the signal PHX. This fast comparator 12 is designed with an unbalanced input stage so as to have a slightly positive threshold that will compensate its own delay and its statistical offset, even though these are very low.

The information at output from the comparator 12 (on the points of crossing of the 0-V level by the signal PHX) is sent at input to an AND logic gate 16, together with the output of the block 14, which supplies the information that the event of falling edge of the signal PWMX has occurred.

Consequently, in these conditions an under-voltage is present in the desired area of the signal PHX. The under-voltage is indicative of the fact that it is necessary to anticipate the signal PWMY by a value δtshift. This signal, at the start, will correspond to PWMY_nom and, cycle after cycle, will be anticipated in time until a signal PWMY_targ is reached that enables the quasi-ZCS and ZVS condition mentioned previously to be satisfied.

To create the time δtshift, the output of the AND logic gate 16 is sent at input to a digital block 18, which creates two time windows of different duration.

The first window T1 starts as soon as the output of the AND gate 16 switches from the value "0" to the value "1" and lasts a time t1 during which the switch IT1 is closed.

The second window T2 creates a time t2<<t1 during which the switch IT2 is closed.

In the case where the signal PHX does not present under-voltage, the switch T1 is not closed, whereas, after a fixed delay with respect to the falling edge (FE) of the signal PWMX, the switch IT2 is closed once again for a time t2.

It follows that, at each cycle of the signal PWM in which an under-voltage is intercepted, the capacitance C is discharged by a current I greater than the current at which it was charged in the previous cycle. If no under-voltage is intercepted, the capacitance C is instead only charged by a small value. This mechanism makes it possible to obtain bidirectionality of the correction made.

At start-up of the circuit, the capacitance C is precharged to a certain threshold identified by Vstart, a threshold that is also used if a sudden reset is necessary during operation of the circuit.

Figure 10:
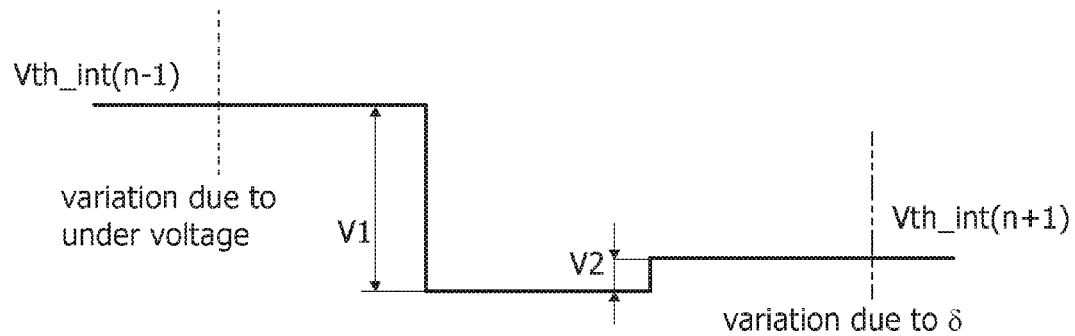
FIG. 10 shows the variation of the voltage threshold when an under-voltage is identified.

Illustrated in FIG. 10 is the variation of the threshold Vth_int during a cycle in which an under-voltage is intercepted. In step (n−1) the variation V1 is due to the under-voltage, then in step (n) a variation V2 due to δ is added, and finally the new threshold Vth_int(n+1) is obtained.

In the case where there were to be no under-voltage on the signal PHASE, the variation V1 would not be present, and there would only be the increase V2 of the threshold due to δ.

At each cycle of the signal PWM, the threshold Vth_int at output from the buffer 20 is compared by the comparator COMPrise 22 with a ramp 22a that increases with a constant slope starting from the rising edge (RE) of the signal PWMX and is reset at the falling edge (FE) of the signal PWMX.

The output OUT_RISE of the comparator COMPrise 22 undergoes transition when the threshold intercepts the ramp: this condition occurs after a delay with respect to the rising edge (RE) of the signal PWMX identified by the module 22b that depends upon the value reached at that point by the threshold Vth_int and by the initial value of the ramp and by its slope.

Likewise, the threshold Vth_int at each cycle is also compared with a ramp that is the same the previous one but starts at the moment of the falling edge (FE) of the signal PWMX and is reset, instead, at the rising edge (RE) of the signal PWMX. This comparison, implemented by the comparator COMPfall 24, is made in such a way that the output OUT_FALL switches from "1" to "0" after a delay equal to the previous one but applied starting from the falling edge (FE) of the signal PWMX.

The signals OUT_RISE and OUT_FALL, together with the signals PWMX and PWMY_nom, are passed to a logic module 26, which executes the function described hereinafter.

After the rising edge (RE) of the signal PWMX, it switches its output PWMY_OUT from "0" to "1", executing a logic OR between PWMY_nom and OUT_RISE;

After the falling edge (FE) of the signal PWMX, it switches its output PWMY_OUT from "1" to "0", executing a logic AND between PWMY_nom and OUT_FALL.

Consequently, it is necessary to choose in an accurate way an appropriate initial threshold value Vstart and an appropriate starting value and slope of the ramp in such a way as to be sure that at the start of operation of the system, the events OUT_RISE and OUT_FALL occur after a delay with respect to the rising edge (RE) of the signal PWMX and to the falling edge (FE) of the signal PWMX, respectively, where this delay is greater than the maximum nominal time Tshift_nom that it is intended to cover at an applicational level.

Figure 11:
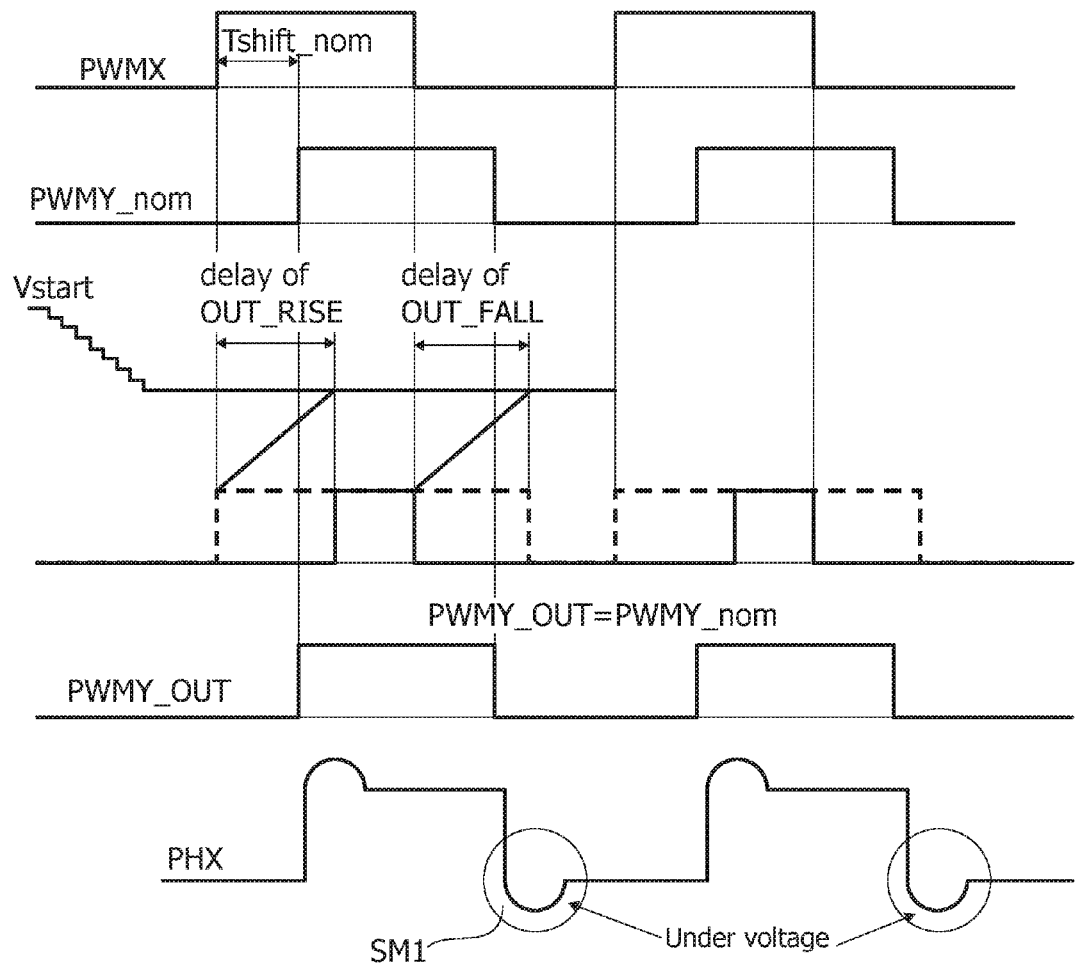
FIGS. 11, 12, and 13 show timing charts that illustrate how to determine the value of the delay Tshift.
Figure 12:
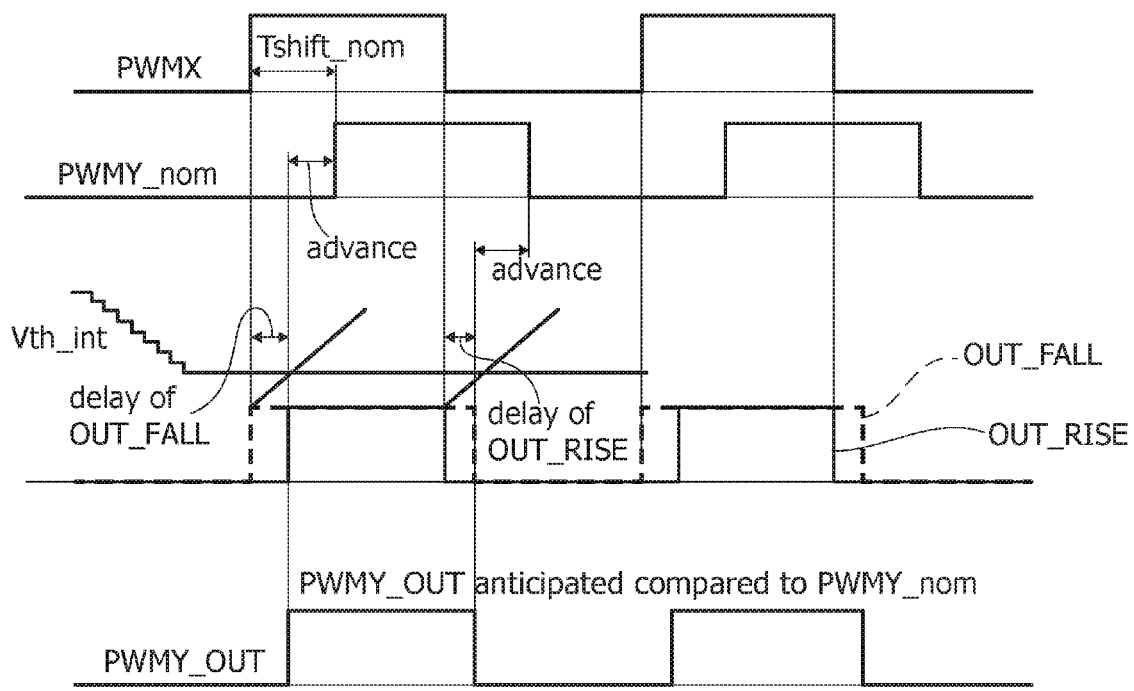
Figure 12:
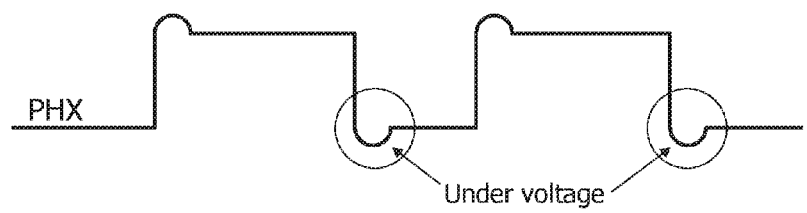

With reference to FIG. 11, in this way an evolution of the converter will be obtained such that at the start the signal PWMY_OUT of the ZVS logic module coincides with PWMY_nom, but since, on account of the way in which the value of the time Tshift_nom has been chosen, an under-voltage SM1 will be created on the node PHX, at each cycle the threshold Vth_int will decrease and at a certain point the events OUT_RISE and OUT_FALL will occur, respectively, before the rising edge (RE) and the falling edge (FE) of the signal PWMY_nom, which results in a signal PWMY_OUT anticipated with respect to the signal PWMY_nom (see FIG. 12).

Using the signal PWMY_OUT, instead of the signal PWMY_nom, as control signal for the drivers that switch the MOS transistors on and off, it is evident that the advance of the signal PWMY_OUT with respect to the signal PWMY_nom will determine, for the reasons explained previously, a reduction of the under-voltage and over-voltage peaks (see the comparison between FIG. 11 and FIG. 12).

However, this advance will continue to increase up to the cycle where there is no longer formation of the under-voltage peaks. In this condition, the threshold Vth_int will only be increased by the small value δ, and no longer reduced, and consequently, at the next cycle, the signal PWMY_OUT will be delayed slightly, and no longer anticipated.

Figure 13:
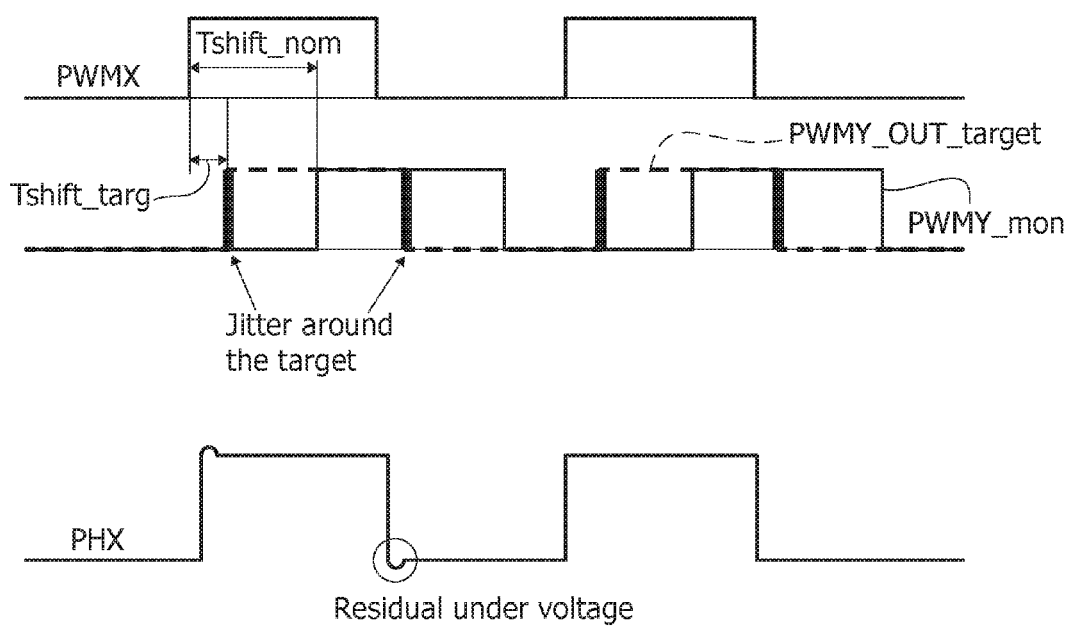

This will continue until only a slight hint of under-voltage of the signal PHX is obtained, as shown in FIG. 13.

At this point, the situation again reverses, and the signal PWMY_OUT will again be anticipated. In practice, a condition of equilibrium will be reached, where the signal PWMY_OUT will shift around a value Tshift_target (see FIG. 13) that will guarantee the ZVS and quasi-ZCS condition, with a jitter depending upon the analog parameters of the driving module of the converter (these parameters being the value of the times t1 and t2 of closing of the switches for discharging and charging the capacitance C, the value of the capacitance C itself, the value of the charging and discharging current I, the slope of the ramp, the delays and offsets of the comparators COMPrise and COMPfall, etc.), and with an under-voltage that in this condition will oscillate, according to the jitter, between a zero condition and a condition of negligible under-voltage (such that the diodes within the transistors do not enter into conduction).

It is thus important to calibrate all these parameters in order to obtain a suitably small jitter.

Of course, without prejudice to the principles of the present disclosure, the details of construction and the embodiments may vary widely with respect to what has been described and illustrated herein purely by way of example, without thereby departing from the scope of the present disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A resonant converter, comprising:
a primary switching circuit having at least a primary winding and a primary full-bridge switching stage which is configured for driving said primary winding, and a resonance inductor in series with the primary winding, the full-bridge switching stage including an upper switching half-bridge and a lower switching half-bridge;
a secondary resonant circuit having a secondary winding magnetically coupled to the primary winding, and a resonance capacitor electrically connected in parallel to the secondary winding;
a secondary rectification stage electrically connected in parallel to the resonance capacitor; and
a driving module configured to,
receive a signal representing a voltage measured across the upper switching half-bridge or the lower switching half-bridge,
detect a presence of a negative voltage in the signal representing the voltage measured across said upper switching half-bridge or lower switching half-bridge,
at each switching cycle of control signals applied to switches of the lower switching half-bridge or the upper switching half-bridge, anticipate a control signal for control of the switches of the lower switching half-bridge or upper switching half-bridge that is to be activated at the next switching cycle by a shift time that is reduced at each cycle until a condition of absence of the negative voltage in the signal representing the voltage measured across said upper switching half-bridge or lower switching half-bridge is satisfied.

2. The resonant converter according to claim 1, wherein, in switching cycles subsequent to one where the condition of absence of the negative voltage in the signal representing the voltage measured across said upper switching half-bridge or lower switching half-bridge is satisfied, the control signal for control of the switches of the lower switching half-bridge or upper switching half-bridge is delayed by a small amount until a presence of a new negative voltage in the signal representing the voltage measured across said upper switching half-bridge or lower switching half-bridge is detected.

3. The resonant converter according to claim 1, wherein said shift time is initially chosen longer than a time of maximum resonance of a main resonance network formed by the resonance inductor and the resonance capacitor.

4. The resonant converter according to claim 1, wherein high-side switches in each of the upper switching half-bridge and the lower switching half bridge and low-side switches in each of the upper switching half-bridge and the lower switching half-bridge of the primary switching circuit are transistors.

5. The resonant converter according to claim 4, wherein said transistors are power MOSFETs.

6. The resonant converter according to claim 5,
wherein, within the upper switching half-bridge or lower switching half-bridge between turning-off of the high-side power MOSFET and turning-on of a respective low-side power MOSFET, and vice versa, a dead time elapses to prevent setting-up of a direct current path between ground and a supply voltage;
wherein, during said dead time, a secondary resonance is generated that involves a parasitic capacitance between drain and source terminals of the power MOSFETs and the resonance inductor; and
wherein the driving module is configured to select:
the dead time is less than ¼ of Tres_oss_min, where Tres_oss_min is a smallest possible value of the secondary resonance that involves the parasitic capacitance and the resonance inductor; and
the shift time, which is designated Tshift, is much greater than Tres_max, where Tres_max is a longest possible resonance period of the main resonance network formed by the resonance inductor and the resonance capacitor.

7. A resonant converter, comprising:
a primary switching circuit including,
a primary winding
a resonance inductive circuit coupled in series with the primary winding; and
a primary full-bridge switching circuit coupled to the resonance inductive circuit coupled in series with the primary winding and configured to drive the primary winding, the primary-full bridge switching circuit including an upper switching half-bridge circuit and a lower switching half-bridge circuit;
a secondary resonant circuit having a secondary winding magnetically coupled to the primary winding, and a resonance capacitive circuit electrically coupled in parallel with the secondary winding; and
a driving circuit configured to detect whether a phase signal, which is provided by one of the upper and lower switching half-bridge circuits in response to a first control signal applied to the one of the upper and lower switching half-bridge circuits, exceeds a first threshold value, and the driving circuit further configured, responsive to the phase signal exceeding the first threshold value, to control a time shift between the first control signal and a second control signal applied to the other one of the upper and lower switching half-bridge circuits, and to adjust the time shift each switching cycle of the first and second control signals until the phase signal does not exceed a second threshold value.

8. The resonant converter of claim 7, wherein each of the switching half-bridge circuits comprises a high-side transistor and a low-side transistor coupled in series between a supply voltage configured to receive a supply voltage and a reference node that receives a reference voltage.

9. The resonant converter of claim 8, wherein each of the high-side and low-side transistors comprises a MOS transistor.

10. The resonant converter of claim 9, wherein the first threshold value has a value that causes switching of the MOS transistors of the switching half-bridge circuits not to occur under zero-voltage and zero-current switching conditions, and wherein the second threshold value has a value that causes switching of the MOS transistors of the switch half-bridge circuits to occur under zero-voltage switching and quasi zero-current switching conditions.

11. The resonant converter of claim 9, wherein the driving circuit is further configured to provide for each of the switching half-bridge circuits a dead time between a switching off of the high-side transistor and a switching on of the low-side transistor and to provide the dead time between a switching on of the high-side transistor and a switching off of the low-side transistor.

12. The resonant converter of claim 11, wherein during the dead time a secondary resonance occurs due to parasitic capacitances between drain and source terminals of the MOS transistors and the resonance inductive circuit and wherein the provided dead time is less than ¼ of Tres_oss_min, where Tres_oss_min is a smallest possible value of secondary resonance due to the parasitic capacitances and the resonance inductive circuit.

13. The resonant converter of claim 12, wherein the driving circuit is further configured to provide a value for the time shift that is much greater than Tres_max, where Tres_max is a longest possible resonance period of a main resonance network formed by the resonance inductive circuit and the resonance capacitive circuit.

14. The resonant converter of claim 13, where the resonance inductive circuit is a single inductor and the resonance capacitive circuit is a single capacitor.

15. The resonant converter of claim 7, wherein in the driving circuit is further configured, once the phase signal does not exceed the first threshold value, to reduce the time shift until the phase signal does not exceed the second threshold value, the first threshold value having a greater magnitude than the second threshold value.

16. The resonant converter of claim 15, wherein the driving circuit initially utilizes a value for the shift time that is longer than a time of maximum resonance of a main resonance network formed by the resonance inductive circuit and the resonance capacitive circuit.

17. A method of controlling a resonant converter, comprising:
receiving a phase signal representing a voltage on a phase node of one of an upper switching half-bridge circuit and lower switching half-bridge circuit of the resonant converter, each of the upper switching half-bridge circuit and lower half-bridge circuit including a high-side switch and a low side switch;

providing for each of the upper and lower switching half-bridge circuits a dead time between a switching off of the high-side switch and a switching on of the low-side switch;
providing for each of the upper and lower switching half-bridge circuits the dead time between a switching off of the low-side switch and a switching on of the high-side switch;
detecting an under voltage or an over voltage in the phase signal during the dead time, the under voltage or over voltage arising from a secondary resonance that occurs due to parasitic capacitances of the switches and a resonant inductive component of the resonant converter;
providing a time shift between a first control signal applied to switches of one of the upper and lower switching half-bridge circuits and a second control signal applied to the switches of the other one of the upper and lower switching half-bridge circuits, the time shift having an initial nominal value; and
reducing a value of the time shift starting from the initial nominal value and reducing the value of the time shift by an incremental value each cycle of the first and second control signals until the under voltage or over voltage in the phase signal is approximately zero.

18. The method of claim 17, wherein providing the dead time comprises providing the dead time that is less than ¼ of Tres_oss_min, where Tres_oss_min is a smallest possible value of secondary resonance due to the parasitic capacitances of the switches and the resonant inductive component.

19. The method of claim 17, wherein providing the time shift includes providing the time shift having the initial nominal value that is longer than a time of a maximum resonance determined by the resonant inductive component and a resonant capacitive component of the resonant converter.

20. The method of claim 17, wherein detecting an under voltage or an over voltage in the phase signal comprises detecting an under voltage of a falling edge of the phase signal on the phase node of the upper switching half-bridge circuit that results during the dead time associated with the first control signal applied to the upper switching half-bridge circuit.

* * * * *